(12) United States Patent
Pavlinsky (10) Patent No.: US 11,837,754 B2
(45) Date of Patent: Dec. 5, 2023

(54) MAGNETIC BATTERY CELL CONNECTION MECHANISM

(71) Applicant: DURACELL U.S. OPERATIONS, INC., Wilmington, DE (US)

(72) Inventor: Robert John Pavlinsky, Oxford, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 193 days.

(21) Appl. No.: 17/138,267

(22) Filed: Dec. 30, 2020

(65) Prior Publication Data

US 2022/0209369 A1 Jun. 30, 2022

(51) Int. Cl.
| | |
|---|---|
| *H01M 50/51* | (2021.01) |
| *H01M 50/548* | (2021.01) |
| *H01M 10/42* | (2006.01) |
| *H01R 13/62* | (2006.01) |
| *H01M 50/503* | (2021.01) |

(52) U.S. Cl.
CPC ......... *H01M 50/51* (2021.01); *H01M 10/425* (2013.01); *H01M 50/503* (2021.01); *H01M 50/548* (2021.01); *H01R 13/6205* (2013.01)

(58) Field of Classification Search
None
See application file for complete search history.

(56) References Cited

U.S. PATENT DOCUMENTS

| | | | |
|---|---|---|---|
| 3,354,565 A | 11/1967 | Emmons et al. | |
| 3,992,228 A | 11/1976 | Depoix | |
| 3,993,985 A | 11/1976 | Chopard et al. | |
| 4,117,475 A | 9/1978 | Ebihara et al. | |

(Continued)

FOREIGN PATENT DOCUMENTS

| | | |
|---|---|---|
| CN | 1084281 A | 3/1994 |
| CN | 1163020 A | 10/1997 |

(Continued)

OTHER PUBLICATIONS

Atmel Corporation, Application Note AVR400: Low Cost A/D Converter, available at http://www.atmel.com/images/doc0942.pfd (last visited Oct. 24, 2013).

(Continued)

*Primary Examiner* — Carmen V Lyles-Irving
(74) *Attorney, Agent, or Firm* — MARSHALL, GERSTEIN & BORUN LLP (57) ABSTRACT

A magnetic battery cell connection mechanism includes a first battery cell and a second battery cell. A first connector has a first body including a first electrical pathway. A first electrical contact is disposed on the first body and electrically connected to the first electrical pathway. A first magnet is connected to the first body, the first magnet being adapted to magnetically releasably secure the first body to a positive terminal of the first battery cell. A second connector has a second body including a second electrical pathway. A second electrical contact is disposed on the second body and electrically connected to the second electrical pathway. A second magnet is connected to the second body, the second magnet being adapted to magnetically releasably secure the second body to a negative terminal of the second battery cell. The first connector and the second connector are electrically connected to an electrical circuit.

20 Claims, 7 Drawing Sheets

(56) References Cited

U.S. PATENT DOCUMENTS

| | | |
|---|---|---|
| 4,149,146 A | 4/1979 | Ebihara et al. |
| 4,238,554 A | 12/1980 | Barrella |
| 4,302,751 A | 11/1981 | Nakauchi et al. |
| 4,460,870 A | 7/1984 | Finger |
| 4,482,615 A | 11/1984 | Rosansky et al. |
| 4,598,243 A | 7/1986 | Kawakami |
| 4,654,280 A | 3/1987 | Bailey |
| 4,759,765 A | 7/1988 | Van Kampen |
| 4,808,497 A | 2/1989 | Blomgren et al. |
| 4,860,185 A | 8/1989 | Brewer et al. |
| 4,952,330 A | 8/1990 | Leger et al. |
| 5,015,544 A | 5/1991 | Burroughs et al. |
| 5,032,825 A | 7/1991 | Kuznicki |
| 5,188,231 A | 2/1993 | Kivell et al. |
| 5,200,686 A | 4/1993 | Lee |
| 5,219,683 A | 6/1993 | Webber |
| 5,231,356 A | 7/1993 | Parker |
| 5,250,905 A | 10/1993 | Kuo et al. |
| 5,290,414 A | 3/1994 | Marple |
| 5,339,024 A | 8/1994 | Kuo et al. |
| 5,355,089 A | 10/1994 | Treger |
| 5,366,832 A | 11/1994 | Hayashi et al. |
| 5,389,458 A | 2/1995 | Weiss et al. |
| 5,389,470 A | 2/1995 | Parker et al. |
| 5,396,177 A | 3/1995 | Kuo et al. |
| 5,418,086 A | 5/1995 | Bailey |
| 5,424,722 A | 6/1995 | Inada et al. |
| 5,438,607 A | 8/1995 | Przygoda, Jr. et al. |
| 5,458,992 A | 10/1995 | Bailey |
| 5,458,997 A | 10/1995 | Crespi et al. |
| 5,491,038 A | 2/1996 | DePalma et al. |
| 5,494,496 A | 2/1996 | Huhndorff et al. |
| 5,514,491 A | 5/1996 | Webber |
| 5,525,439 A | 6/1996 | Huhndorff et al. |
| 5,543,246 A | 8/1996 | Treger |
| 5,569,556 A | 10/1996 | Bohmer |
| 5,587,573 A | 12/1996 | Owen et al. |
| 5,596,278 A | 1/1997 | Lin |
| 5,607,790 A | 3/1997 | Hughen et al. |
| 5,627,472 A | 5/1997 | Ofer et al. |
| 5,633,592 A | 5/1997 | Lang |
| 5,640,150 A | 6/1997 | Atwater |
| 5,654,640 A | 8/1997 | Bailey |
| 5,691,083 A | 11/1997 | Bolster |
| 5,737,114 A | 4/1998 | Bailey |
| 5,786,106 A | 7/1998 | Armani |
| 5,798,933 A | 8/1998 | Nicolai |
| 5,849,046 A | 12/1998 | Bailey |
| 5,925,479 A | 7/1999 | Wei et al. |
| 5,959,568 A | 9/1999 | Woolley |
| 5,963,012 A | 10/1999 | Garcia et al. |
| 6,014,014 A | 1/2000 | Owen et al. |
| 6,084,523 A | 7/2000 | Gelnovatch et al. |
| 6,127,062 A | 10/2000 | Sargeant et al. |
| 6,143,439 A | 11/2000 | Yoppolo et al. |
| 6,156,450 A | 12/2000 | Bailey |
| 6,169,397 B1 | 1/2001 | Steinbach et al. |
| 6,171,729 B1 | 1/2001 | Gan et al. |
| 6,208,235 B1 | 3/2001 | Trontelj |
| 6,218,054 B1 | 4/2001 | Webber |
| 6,252,377 B1 | 6/2001 | Shibutani et al. |
| 6,275,161 B1 | 8/2001 | Wan et al. |
| 6,300,004 B1 | 10/2001 | Tucholski |
| 6,407,534 B1 | 6/2002 | Mukainakano |
| 6,469,471 B1 | 10/2002 | Anbuky et al. |
| 6,483,275 B1 | 11/2002 | Nebrigic et al. |
| 6,587,250 B2 | 7/2003 | Armgarth et al. |
| 6,617,069 B1 | 9/2003 | Hopper et al. |
| 6,617,072 B2 | 9/2003 | Venkatesan et al. |
| 6,627,353 B1 | 9/2003 | Munshi |
| 6,670,073 B2 | 12/2003 | Tucholski et al. |
| RE38,518 E | 5/2004 | Tucholski |
| 6,730,136 B2 | 5/2004 | Webber |
| 6,774,685 B2 | 8/2004 | O'Toole et al. |
| 6,775,562 B1 | 8/2004 | Owens et al. |
| 6,849,360 B2 | 2/2005 | Marple |
| 6,979,502 B1 | 12/2005 | Gartstein et al. |
| 6,990,171 B2 | 1/2006 | Toth et al. |
| 7,067,882 B2 | 6/2006 | Singh |
| 7,079,079 B2 | 7/2006 | Jo et al. |
| 7,157,185 B2 | 1/2007 | Marple |
| 7,386,404 B2 | 6/2008 | Cargonja et al. |
| 7,474,230 B2 | 1/2009 | Blom et al. |
| 7,489,431 B2 | 2/2009 | Malmstrom et al. |
| 7,511,454 B1 | 3/2009 | Legg |
| 7,561,050 B2 | 7/2009 | Bhogal et al. |
| 7,576,517 B1 | 8/2009 | Cotton et al. |
| 7,586,416 B2 | 9/2009 | Ariyoshi et al. |
| 7,598,880 B2 | 10/2009 | Powell et al. |
| 7,606,530 B1 | 10/2009 | Anderson et al. |
| 7,715,884 B2 | 5/2010 | Book et al. |
| 7,741,970 B2 | 6/2010 | Cunningham et al. |
| 7,745,046 B2 | 6/2010 | Kim et al. |
| 7,768,236 B2 | 8/2010 | Takamura et al. |
| 7,772,850 B2 | 8/2010 | Bertness |
| 7,805,263 B2 | 9/2010 | Mack |
| 7,911,182 B2 | 3/2011 | Cargonja et al. |
| 7,944,368 B2 | 5/2011 | Carter et al. |
| 8,031,054 B2 | 10/2011 | Tuttle |
| 8,106,845 B2 | 1/2012 | Savry |
| 8,119,286 B2 | 2/2012 | Issaev et al. |
| 8,131,486 B2 | 3/2012 | Leonard et al. |
| 8,344,685 B2 | 1/2013 | Bertness et al. |
| 8,368,356 B2 | 2/2013 | Nakashima et al. |
| 8,374,507 B2 | 2/2013 | Hudson et al. |
| 8,424,092 B2 | 4/2013 | Ikeuchi et al. |
| 8,427,109 B2 | 4/2013 | Melichar |
| 8,471,888 B2 | 6/2013 | George et al. |
| 8,652,670 B2 | 2/2014 | Uchida |
| 8,653,926 B2 | 2/2014 | Detcheverry et al. |
| 8,900,731 B2 | 12/2014 | Bohne |
| 8,905,317 B1 | 12/2014 | Hsu et al. |
| 9,037,426 B2 | 5/2015 | Schaefer |
| 9,060,213 B2 | 6/2015 | Jones |
| 9,076,092 B2 | 7/2015 | Ritamaki et al. |
| 9,083,063 B2 | 7/2015 | Specht et al. |
| 9,146,595 B2 | 9/2015 | Forutanpour et al. |
| 9,167,317 B2 | 10/2015 | DeMar |
| 9,189,667 B2 | 11/2015 | Bourilkov et al. |
| 9,235,044 B2 | 1/2016 | Specht et al. |
| 9,297,859 B2 | 3/2016 | Mukaitani et al. |
| 9,312,575 B2 | 4/2016 | Stukenberg et al. |
| 9,331,378 B2 | 5/2016 | Merlin et al. |
| 9,425,487 B2 | 8/2016 | Bertness |
| 9,453,885 B2 | 9/2016 | Mukaitani et al. |
| 9,459,323 B2 | 10/2016 | Mukaitani et al. |
| 9,461,339 B2 | 10/2016 | Roohparvar |
| 9,478,850 B2 | 10/2016 | Bourilkov et al. |
| 9,551,758 B2 | 1/2017 | Bourilkov et al. |
| 9,568,556 B2 | 2/2017 | Bourilkov et al. |
| 9,619,612 B2 | 4/2017 | Kallfelz et al. |
| 9,639,724 B2 | 5/2017 | Bourilkov et al. |
| 9,661,576 B2 | 5/2017 | Tomisawa |
| 9,699,818 B2 | 7/2017 | Grothaus et al. |
| 9,726,763 B2 | 8/2017 | Dempsey et al. |
| 9,739,837 B2 | 8/2017 | Bourilkov et al. |
| 9,746,524 B2 | 8/2017 | Petrucelli |
| 9,774,210 B1 | 9/2017 | Wright |
| 9,823,310 B2 | 11/2017 | Bourilkov et al. |
| 9,841,462 B2 | 12/2017 | Kim et al. |
| 9,843,220 B2 | 12/2017 | Herrmann et al. |
| 9,869,726 B2 | 1/2018 | Zumstein et al. |
| 9,882,250 B2 | 1/2018 | Chappelle et al. |
| 9,887,463 B2 | 2/2018 | Bourilkov et al. |
| 9,893,390 B2 | 2/2018 | Specht et al. |
| 9,983,312 B2 | 5/2018 | Dempsey et al. |
| 10,094,886 B2 | 10/2018 | Bourilkov et al. |
| 10,151,802 B2 | 12/2018 | Riemer et al. |
| 10,184,988 B2 | 1/2019 | Bourilkov et al. |
| 10,297,875 B2 | 5/2019 | Riemer et al. |
| 10,416,309 B2 | 9/2019 | Dempsey et al. |
| 10,483,634 B2 | 11/2019 | Bourilkov et al. |
| 10,859,705 B2 | 12/2020 | Dempsey et al. |
| 2001/0005123 A1 | 6/2001 | Jones et al. |

(56) References Cited

U.S. PATENT DOCUMENTS

| | | |
|---|---|---|
| 2001/0026226 A1 | 10/2001 | Andersson et al. |
| 2002/0001745 A1 | 1/2002 | Gartstein et al. |
| 2002/0086718 A1 | 7/2002 | Bigwood et al. |
| 2003/0070283 A1 | 4/2003 | Webber |
| 2003/0169047 A1 | 9/2003 | Chen |
| 2003/0170537 A1 | 9/2003 | Randell |
| 2003/0184493 A1 | 10/2003 | Robinet et al. |
| 2003/0228518 A1 | 12/2003 | Marple |
| 2004/0029007 A1 | 2/2004 | Kusumoto et al. |
| 2004/0048512 A1 | 3/2004 | Chen |
| 2004/0183742 A1 | 9/2004 | Goff et al. |
| 2005/0038614 A1 | 2/2005 | Botts et al. |
| 2005/0073282 A1 | 4/2005 | Carrier et al. |
| 2005/0095508 A1 | 5/2005 | Yamamoto |
| 2005/0112462 A1 | 5/2005 | Marple |
| 2005/0162129 A1 | 7/2005 | Mutabdzija et al. |
| 2005/0233214 A1 | 10/2005 | Marple et al. |
| 2005/0258797 A1 | 11/2005 | Hung |
| 2005/0277023 A1 | 12/2005 | Marple et al. |
| 2006/0017581 A1 | 1/2006 | Schwendinger et al. |
| 2006/0028179 A1 | 2/2006 | Yudahira et al. |
| 2006/0043933 A1 | 3/2006 | Latinis |
| 2006/0046152 A1 | 3/2006 | Webber |
| 2006/0046153 A1 | 3/2006 | Webber |
| 2006/0046154 A1 | 3/2006 | Webber et al. |
| 2006/0047576 A1 | 3/2006 | Aaltonen et al. |
| 2006/0163692 A1 | 7/2006 | Detecheverry et al. |
| 2006/0168802 A1 | 8/2006 | Tuttle |
| 2006/0170397 A1 | 8/2006 | Srinivasan et al. |
| 2006/0208898 A1 | 9/2006 | Swanson et al. |
| 2006/0247156 A1 | 11/2006 | Vanderby et al. |
| 2006/0261960 A1 | 11/2006 | Haraguchi et al. |
| 2007/0080804 A1 | 4/2007 | Hirahara et al. |
| 2007/0096697 A1 | 5/2007 | Maireanu |
| 2007/0108946 A1 | 5/2007 | Yamauchi et al. |
| 2007/0182576 A1 | 8/2007 | Proska et al. |
| 2007/0210924 A1 | 9/2007 | Arnold et al. |
| 2007/0273329 A1 | 11/2007 | Kobuse et al. |
| 2008/0053716 A1 | 3/2008 | Scheucher |
| 2008/0076029 A1 | 3/2008 | Bowden et al. |
| 2008/0079391 A1 | 4/2008 | Schroeck et al. |
| 2008/0157924 A1 | 7/2008 | Batra |
| 2008/0160392 A1 | 7/2008 | Toya et al. |
| 2008/0206627 A1 | 8/2008 | Wright |
| 2008/0218351 A1 | 9/2008 | Corrado et al. |
| 2008/0252462 A1 | 10/2008 | Sakama |
| 2009/0008031 A1 | 1/2009 | Gould et al. |
| 2009/0009177 A1 | 1/2009 | Kim et al. |
| 2009/0024309 A1 | 1/2009 | Crucs |
| 2009/0041228 A1 | 2/2009 | Owens et al. |
| 2009/0098462 A1 | 4/2009 | Fujiwara et al. |
| 2009/0148756 A1 | 6/2009 | Specht et al. |
| 2009/0155673 A1 | 6/2009 | Northcott |
| 2009/0179763 A1 | 7/2009 | Sheng |
| 2009/0214950 A1 | 8/2009 | Bowden et al. |
| 2009/0263727 A1 | 10/2009 | Josephs et al. |
| 2009/0273473 A1 | 11/2009 | Tuttle |
| 2009/0289825 A1 | 11/2009 | Trinkle |
| 2009/0297949 A1 | 12/2009 | Berkowitz et al. |
| 2009/0308936 A1 | 12/2009 | Nitzan et al. |
| 2010/0019733 A1 | 1/2010 | Rubio |
| 2010/0030592 A1 | 2/2010 | Evans et al. |
| 2010/0073003 A1 | 3/2010 | Sakurai et al. |
| 2010/0081049 A1 | 4/2010 | Holl et al. |
| 2010/0085008 A1 | 4/2010 | Suzuki et al. |
| 2010/0087241 A1 | 4/2010 | Nguyen et al. |
| 2010/0143753 A1 | 6/2010 | Kim et al. |
| 2010/0209744 A1 | 8/2010 | Kim |
| 2010/0219252 A1 | 9/2010 | Kikuchi et al. |
| 2010/0295943 A1 | 11/2010 | Cha et al. |
| 2010/0308974 A1 | 12/2010 | Rowland et al. |
| 2011/0018777 A1 | 1/2011 | Brown |
| 2011/0023130 A1 | 1/2011 | Gudgel et al. |
| 2011/0104520 A1 | 5/2011 | Ahn |
| 2011/0123874 A1 | 5/2011 | Issaev et al. |
| 2011/0163752 A1 | 7/2011 | Janousek et al. |
| 2011/0293969 A1 | 12/2011 | Hoofman et al. |
| 2012/0021266 A1 | 1/2012 | Marple et al. |
| 2012/0056002 A1 | 3/2012 | Ritamaki et al. |
| 2012/0081774 A1 | 4/2012 | De Paiva Martins et al. |
| 2012/0086615 A1 | 4/2012 | Norair |
| 2012/0121943 A1 | 5/2012 | Roohparvar |
| 2012/0183862 A1 | 7/2012 | Gupta et al. |
| 2012/0190305 A1 | 7/2012 | Wuidart |
| 2012/0206102 A1 | 8/2012 | Okamura et al. |
| 2012/0206302 A1 | 8/2012 | Ramachandran et al. |
| 2012/0217971 A1 | 8/2012 | Deluca |
| 2012/0235870 A1 | 9/2012 | Forster |
| 2012/0277832 A1 | 11/2012 | Hussain |
| 2012/0299597 A1 | 11/2012 | Shigemizu |
| 2012/0323511 A1 | 12/2012 | Saigo et al. |
| 2013/0069768 A1 | 3/2013 | Madhyastha et al. |
| 2013/0117595 A1 | 5/2013 | Murawski et al. |
| 2013/0127611 A1 | 5/2013 | Bernstein et al. |
| 2013/0148283 A1 | 6/2013 | Forutanpour et al. |
| 2013/0154652 A1 | 6/2013 | Rice et al. |
| 2013/0161380 A1 | 6/2013 | Joyce et al. |
| 2013/0162402 A1 | 6/2013 | Amann et al. |
| 2013/0162403 A1 | 6/2013 | Striemer et al. |
| 2013/0162404 A1 | 6/2013 | Striemer et al. |
| 2013/0164567 A1 | 6/2013 | Olsson et al. |
| 2013/0171479 A1 | 7/2013 | Kim et al. |
| 2013/0183568 A1 | 7/2013 | Babinec et al. |
| 2013/0185008 A1 | 7/2013 | Itabashi et al. |
| 2013/0271072 A1 | 10/2013 | Lee et al. |
| 2013/0295421 A1 | 11/2013 | Teramoto et al. |
| 2013/0320989 A1 | 12/2013 | Inoue et al. |
| 2014/0062663 A1 | 3/2014 | Bourilkov et al. |
| 2014/0139380 A1 | 5/2014 | Ouyang et al. |
| 2014/0188413 A1 | 7/2014 | Bourilkov et al. |
| 2014/0197802 A1 | 7/2014 | Yamazaki |
| 2014/0229129 A1 | 8/2014 | Campbell et al. |
| 2014/0302348 A1 | 10/2014 | Specht et al. |
| 2014/0302351 A1 | 10/2014 | Specht et al. |
| 2014/0320144 A1 | 10/2014 | Nakaya |
| 2014/0342193 A1 | 11/2014 | Mull et al. |
| 2014/0346873 A1 | 11/2014 | Colangelo et al. |
| 2014/0347249 A1 | 11/2014 | Bourilkov et al. |
| 2014/0370344 A1 | 12/2014 | Lovelace et al. |
| 2014/0379285 A1 | 12/2014 | Dempsey et al. |
| 2015/0061603 A1 | 3/2015 | Loftus et al. |
| 2015/0064524 A1 | 3/2015 | Noh et al. |
| 2015/0162649 A1 | 6/2015 | Bae et al. |
| 2015/0349391 A1 | 12/2015 | Chappelle et al. |
| 2015/0357685 A1 | 12/2015 | Iwasawa et al. |
| 2016/0034733 A1 | 2/2016 | Bourilkov et al. |
| 2016/0049695 A1 | 2/2016 | Lim et al. |
| 2016/0064781 A1 | 3/2016 | Specht et al. |
| 2016/0092847 A1 | 3/2016 | Buchbinder |
| 2016/0137088 A1 | 5/2016 | Lim et al. |
| 2016/0154025 A1 | 6/2016 | Song et al. |
| 2016/0277879 A1 | 9/2016 | Daoura et al. |
| 2017/0040698 A1 | 2/2017 | Bourilkov et al. |
| 2017/0062841 A1 | 3/2017 | Riemer et al. |
| 2017/0062880 A1 | 3/2017 | Riemer et al. |
| 2017/0092994 A1 | 3/2017 | Canfield et al. |
| 2017/0125855 A1 | 5/2017 | Gong et al. |
| 2017/0176539 A1 | 6/2017 | Younger |
| 2017/0286918 A1 | 10/2017 | Westermann et al. |
| 2017/0301961 A1 | 10/2017 | Kim et al. |
| 2017/0315183 A1 | 11/2017 | Chao et al. |
| 2017/0331162 A1 | 11/2017 | Clarke et al. |
| 2018/0040929 A1 | 2/2018 | Chappelle et al. |
| 2018/0088182 A1 | 3/2018 | Bourilkov et al. |
| 2018/0120386 A1 | 5/2018 | Riemer et al. |
| 2018/0123174 A1 | 5/2018 | Riemer et al. |
| 2018/0123175 A1 | 5/2018 | Riemer et al. |
| 2018/0123176 A1 | 5/2018 | Riemer et al. |
| 2018/0123233 A1 | 5/2018 | Bourilkov et al. |
| 2018/0159225 A1 | 6/2018 | Bourilkov et al. |
| 2019/0113579 A1 | 4/2019 | Riemer et al. |

(56) References Cited

U.S. PATENT DOCUMENTS

| | | |
|---|---|---|
| 2019/0137572 A1 | 5/2019 | Bourilkov et al. |
| 2020/0011997 A1 | 1/2020 | Dempsey et al. |

FOREIGN PATENT DOCUMENTS

| | | |
|---|---|---|
| CN | 1228540 A | 9/1999 |
| CN | 1315072 A | 9/2001 |
| CN | 1529182 A | 9/2004 |
| CN | 2828963 Y | 10/2006 |
| CN | 101126795 A | 2/2008 |
| CN | 201142022 Y | 10/2008 |
| CN | 201233435 Y | 5/2009 |
| CN | 101702792 A | 5/2010 |
| CN | 101785164 A | 7/2010 |
| CN | 102097844 A | 6/2011 |
| CN | 102142186 A | 8/2011 |
| CN | 102544709 A | 7/2012 |
| CN | 202308203 U | 7/2012 |
| CN | 202720320 U | 2/2013 |
| CN | 202856390 U | 4/2013 |
| CN | 103682482 A | 3/2014 |
| CN | 104635169 A | 5/2015 |
| CN | 105337367 A | 2/2016 |
| CN | 205160145 U | 4/2016 |
| CN | 106405241 A | 2/2017 |
| CN | 106848448 A | 6/2017 |
| CN | 107284272 A | 10/2017 |
| CN | 206804833 U | 12/2017 |
| DE | 10118027 A1 | 11/2002 |
| DE | 10118051 A1 | 11/2002 |
| EP | 0523901 A1 | 1/1993 |
| EP | 1450174 A1 | 8/2004 |
| EP | 1693807 A1 | 8/2006 |
| EP | 1786057 A2 | 5/2007 |
| EP | 1821363 A1 | 8/2007 |
| EP | 2065962 A1 | 6/2009 |
| EP | 2204873 A1 | 7/2010 |
| EP | 2324535 A1 | 5/2011 |
| EP | 2328223 A1 | 6/2011 |
| EP | 2645447 A1 | 10/2013 |
| EP | 2680093 A2 | 1/2014 |
| EP | 2790262 A1 | 10/2014 |
| EP | 3128599 A1 | 2/2017 |
| JP | S52005581 A | 1/1977 |
| JP | 61169781 | 7/1986 |
| JP | 02142324 | 5/1990 |
| JP | H03131771 A | 6/1991 |
| JP | H06284170 A | 10/1994 |
| JP | H09005366 A | 1/1997 |
| JP | 10014003 | 1/1998 |
| JP | 2000077928 A | 3/2000 |
| JP | 2001022905 A | 1/2001 |
| JP | 2004085580 A | 3/2004 |
| JP | 2004-253858 A | 9/2004 |
| JP | 2004534430 A | 11/2004 |
| JP | 2005327099 A | 11/2005 |
| JP | 2006139544 A | 6/2006 |
| JP | 2006284431 A | 10/2006 |
| JP | 2006324074 A | 11/2006 |
| JP | 2007515848 A | 6/2007 |
| JP | 2007171045 A | 7/2007 |
| JP | 2008042985 A | 2/2008 |
| JP | 2008-530682 A | 8/2008 |
| JP | 2008181855 A | 8/2008 |
| JP | 2009-37374 | 2/2009 |
| JP | 2010098361 A | 4/2010 |
| JP | 2010-154012 A | 7/2010 |
| JP | 2011113759 A | 6/2011 |
| JP | 2011203595 A | 10/2011 |
| JP | 2012/0056002 A | 3/2012 |
| JP | 2012085491 A | 4/2012 |
| JP | 2012-129183 A | 7/2012 |
| JP | 2012161614 A | 8/2012 |
| JP | 2012170262 A | 9/2012 |
| JP | 2013-038967 A | 2/2013 |
| JP | 2013038961 A | 2/2013 |
| JP | 2013120640 A | 6/2013 |
| KR | 2011-0018488 A | 2/2011 |
| TW | M510009 U | 10/2015 |
| TW | I580153 B | 4/2017 |
| WO | WO-95/01062 A1 | 1/1995 |
| WO | WO-03/047064 A2 | 6/2003 |
| WO | WO-2004/047215 A1 | 6/2004 |
| WO | WO-2004/107251 A2 | 12/2004 |
| WO | WO-2005/078673 A1 | 8/2005 |
| WO | WO-2006/048838 A1 | 5/2006 |
| WO | WO-2006/085291 A2 | 8/2006 |
| WO | WO-2008/151181 A1 | 12/2008 |
| WO | WO-2008/156735 A1 | 12/2008 |
| WO | WO-2010/127509 A1 | 11/2010 |
| WO | WO-2011/063679 A1 | 6/2011 |
| WO | WO-2011/096863 A1 | 8/2011 |
| WO | WO-2012/051272 A2 | 4/2012 |
| WO | WO-2012/061262 A1 | 5/2012 |
| WO | WO-2012/070635 A1 | 5/2012 |
| WO | WO-2012/083759 A1 | 6/2012 |
| WO | WO-2013/022857 A2 | 2/2013 |
| WO | WO-2013/024341 A1 | 2/2013 |
| WO | WO-2013/069423 A1 | 5/2013 |
| WO | WO-2013/084481 A1 | 6/2013 |
| WO | WO-2013/101652 A1 | 7/2013 |
| WO | WO-2015/183609 A1 | 12/2015 |
| WO | WO-2016/146006 A1 | 9/2016 |
| WO | WO-2016/166735 A1 | 10/2016 |
| WO | WO-2016/172542 A1 | 10/2016 |

OTHER PUBLICATIONS

Chinese patent application No. 201480034145.1, Notification of First Office Action (with English translation), dated May 4, 2017.

Chinese Patent Application No. 201480034145.1, Notification of the Second Office Action, dated Jan. 19, 2018.

European Patent Application No. 14813210.3, Communication Pursuant to Article 94(3) EPC, dated Sep. 17, 2020.

European Patent Application No. 14813210.3, Summons to Attend Oral Proceedings Pursuant to Rule 115(1) EPC, dated Feb. 11, 2020.

European patent application No. EP 14813210, Supplementary European Search Report, dated Nov. 25, 2016.

Japanese patent application No. 2016-521535, Notice of Rejection, dated Nov. 15, 2016.

Kooser, Tethercell magically turns AA batteries into Bluetooth devices, CNET.com, downloaded from the Internet at: <https://www.cnet.com/news/tethercell-magically-turns-aa-batteries-into-bluetooth-devices/> (Jan. 8, 2013).

PCT International Search report with Written Opinion in corresponding International application PCT/US2014/042898 dated Nov. 7, 2014.

Tethercell Smart Battery Adapter fundraising campaign on Indiegogo website (<https://www.indiegogo.com/projects/tethercell-smart-battery-adapter#/>) (launched Oct. 2013).

Tethercell video uploaded at <https://vimeo.com/53823785> (Oct. 2012).

Yamashiro, Voltage Detecting Circuit, Japanese Patent No. 52005581, Hitashi Ltd., (Jan. 17, 1977), Translated by the United States Patent and Trademark Office via Phoenix Translations (Elgin, TX) in Feb. 2018.

International Application No. PCT/US2021/064871, International Search Report and Written Opinion, dated Apr. 4, 2022.

MAGNETIC BATTERY CELL CONNECTION MECHANISM

FIELD OF THE DISCLOSURE

The disclosure relates generally to battery indicators and, more specifically relates to a magnetic battery cell connection mechanism for providing power to an external load such as battery indicator.

BACKGROUND

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode. The battery components are disposed in a can, or housing, that is typically made from metal.

When a battery is used as an electrical energy source in an electronic device, electrical contact is made to the anode and the cathode, thereby completing a circuit that allows electrons to flow through the device, and which results in respective oxidation and reduction reactions that produce electrical power to the electronic device. An electrolyte is in contact with the anode, the cathode, and the separator. The electrolyte contains ions that flow through the separator between the anode and cathode to maintain charge balance throughout the battery during discharge.

There is a growing need for portable power for electronic devices such as toys; remote controls; audio devices; flashlights; digital cameras and peripheral photography equipment; electronic games; toothbrushes; radios; clocks, and other portable electronic devices. Consumers need to have power readily available for these electronic devices. Because batteries necessarily become depleted of power over time as they are used, consumers need to have access to spare batteries (and/or access to fully recharged rechargeable batteries). It is helpful for a consumer to know the power state of a battery currently in use so that the consumer can have quick access to the needed number of replacement batteries. Batteries come in common sizes, such as the AA, AAA, AAAA, C, and D battery sizes, that have fixed external dimensions and constrained internal volumes per ANSI standard.

Currently, some batteries include on-cell battery charge indicators to help a consumer determine when a battery is nearly depleted and in need of replacement. However, these current on-cell battery charge indicators are single use (i.e., attached to a single battery cell) and cumbersome (because typically two contact buttons must be simultaneously depressed to activate the indicator). Additionally, these on-cell battery indicators require removal of the battery from an electronic device (or package) in order to use the indicator.

SUMMARY

According to a first aspect, a magnetic battery cell connection mechanism includes a first battery cell having a positive terminal and a negative terminal and a second battery cell having a positive terminal and a negative terminal. A first connector has a first body including a first electrical pathway. A first electrical contact is disposed on the first body and electrically connected to the first electrical pathway, the first electrical contact being adapted to allow electricity to pass from the positive terminal of the first battery cell to the first electrical pathway. A first magnet is connected to the first body, the first magnet being adapted to magnetically releasably secure the first body to the positive terminal of the first battery cell and to establish contact between the positive terminal of the first battery cell and the first electrical pathway. A second connector has a second body including a second electrical pathway. A second electrical contact is disposed on the second body and electrically connected to the second electrical pathway, the second electrical contact being adapted to allow electricity to pass from the negative terminal of the second battery cell to the second electrical pathway. A second magnet is connected to the second body, the second magnet being adapted to magnetically releasably secure the second body to the negative terminal of the second battery cell and to establish contact between the negative terminal of the second battery cell and the second electrical pathway. Each of the first connector and the second connector is electrically connected to an electrical circuit.

According to a second aspect, a magnetic battery cell connection mechanism includes a first battery cell having a positive terminal and a negative terminal. A first connector includes a first body including a first electrical pathway. A first electrical contact is disposed on the first body and electrically connected to the first electrical pathway, the first electrical contact being adapted to allow electricity to pass from the positive terminal of the first battery cell to the first electrical pathway. A first magnet is at least partially seated in the first electrical contact, the first magnet being adapted to magnetically releasably secure the first body to the positive terminal of the first battery cell. A second connector includes a second body including a second electrical pathway. A second electrical contact is disposed on the second body and electrically connected to the second electrical pathway, the second electrical contact being adapted to allow electricity to pass from the negative terminal of the first battery cell to the second electrical pathway. A second magnet is at least partially seated in the second electrical contact, the second magnet being adapted to magnetically releasably secure the second body to the negative terminal of the first battery cell. Each of the first connector and the second connector is electrically connected to an electrical circuit.

According to a third aspect, a magnetic battery cell connector includes a body having a first arm and a second arm that diverge away from one another, and an electrical pathway. An electrical contact is located proximate a terminal end of one of the first arm and the second arm. The electrical contact is electrically connected to the electrical pathway. The electrical contact is adapted to allow electricity to pass from a battery cell terminal to the first electrical pathway. A magnet is at least partially seated in the electrical contact. The magnet is adapted to magnetically releasably secure the first body to the battery cell.

In accordance with the teachings of the disclosure, any one or more of the foregoing aspects of a magnetic battery cell connection mechanism or a magnetic battery cell connector may further include any one or more of the following optional forms.

In some optional forms, the first magnet comprises the first electrical contact.

In other optional forms, the second magnet comprises the second electrical contact.

In yet other optional forms, one of the first body or the second body comprises a first arm and a second arm that diverge away from one another.

In yet other optional forms, the first and second arms form one of an arc-shape, a u-shape, and a v-shape.

In yet other optional forms, the first and second arms form an arc-shape and an inner radius of the arc-shape is substantially the same as a battery end cap of one of the first battery cell or the second battery cell.

In yet other optional forms, the first magnet is located on the first arm and the first electrical contact is located on the second arm.

In yet other optional forms, the first magnet and the first electrical contact are located on the same arm.

In yet other optional forms, the first electrical contact is cup-shaped and the first magnet is at least partially seated in the first electrical contact.

In yet other optional forms, a first contact plate is located proximate an end of the first arm and the first magnet is disposed on the first contact plate.

In yet other optional forms, a second contact plate is located proximate an end of the second arm.

In yet other optional forms, one of the first body or the second body comprises a printed circuit board (PCB).

BRIEF DESCRIPTION OF THE DRAWINGS

While the specification concludes with claims particularly pointing out and distinctly claiming the subject matter, which is regarded as forming the present invention, the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries (or disposable batteries) are described, for example, in David Linden, *Handbook of Batteries* (4$^{th}$ ed. 2011). Secondary batteries (or rechargeable batteries) are intended to be recharged and used over and over again. Secondary batteries may be discharged and recharged many times, e.g., more than fifty times, a hundred times, or more. Secondary batteries are described, for example, in David Linden, *Handbook of Batteries* (4$^{th}$ ed. 2011). Accordingly, batteries may include various electrochemical couples and electrolyte combinations. Although the description and examples provided herein are generally directed towards primary alkaline electrochemical cells, or batteries, it should be appreciated that the invention applies to both primary and secondary batteries of aqueous, nonaqueous, ionic liquid, and solid state systems. Primary and secondary batteries of the aforementioned systems are thus within the scope of this application and the invention is not limited to any particular embodiment.

The magnetic battery cell connectors and magnetic battery cell connection mechanisms described herein advantageously provide a user adjustable voltage supply across a single battery cell or across a multiple battery cell stack to meet power requirements of an external load, such as a battery indicator. Moreover, the disclosed magnetic battery cell connectors and magnetic battery cell connection mechanisms advantageously are capable of delivering separate cell information or total cell array information to the battery indicator. The shape of the connectors advantageously fits within a battery cavity of a device without interference with the device contact terminals or neighboring battery cells and connects to battery cells without the need to remove the battery cells from the battery cavity. Additionally, the shape of the connectors allows the connector to rotate about the battery cell terminal without becoming disconnected from the battery cell terminal.

Figure 1:
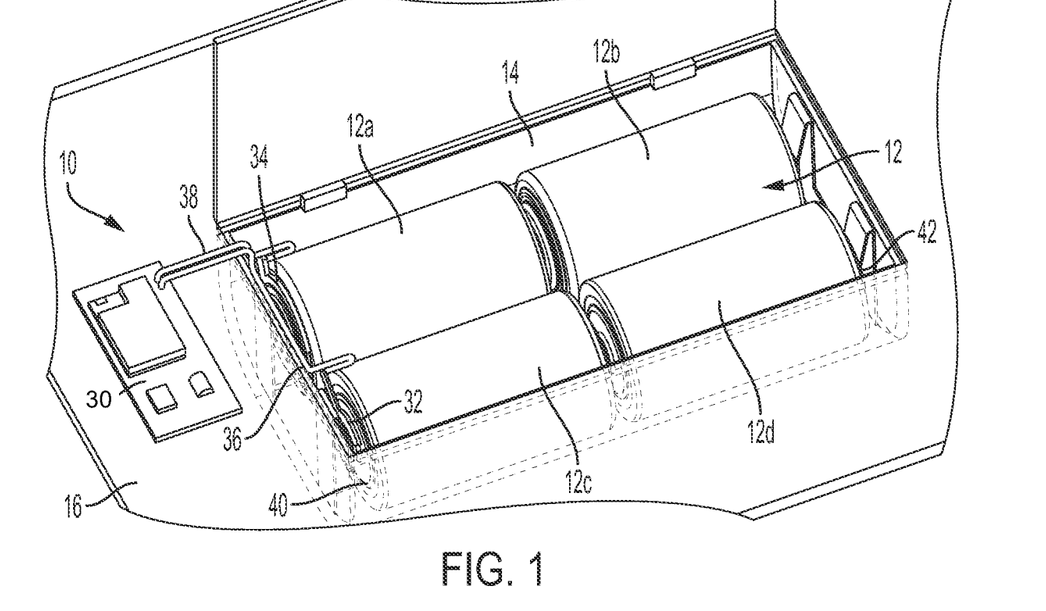
FIG. 1 is a perspective view of a battery cell connection mechanism installed two battery cells in an array of batteries in a battery cavity of a device and connected to a battery indicator module.
Figure 2:
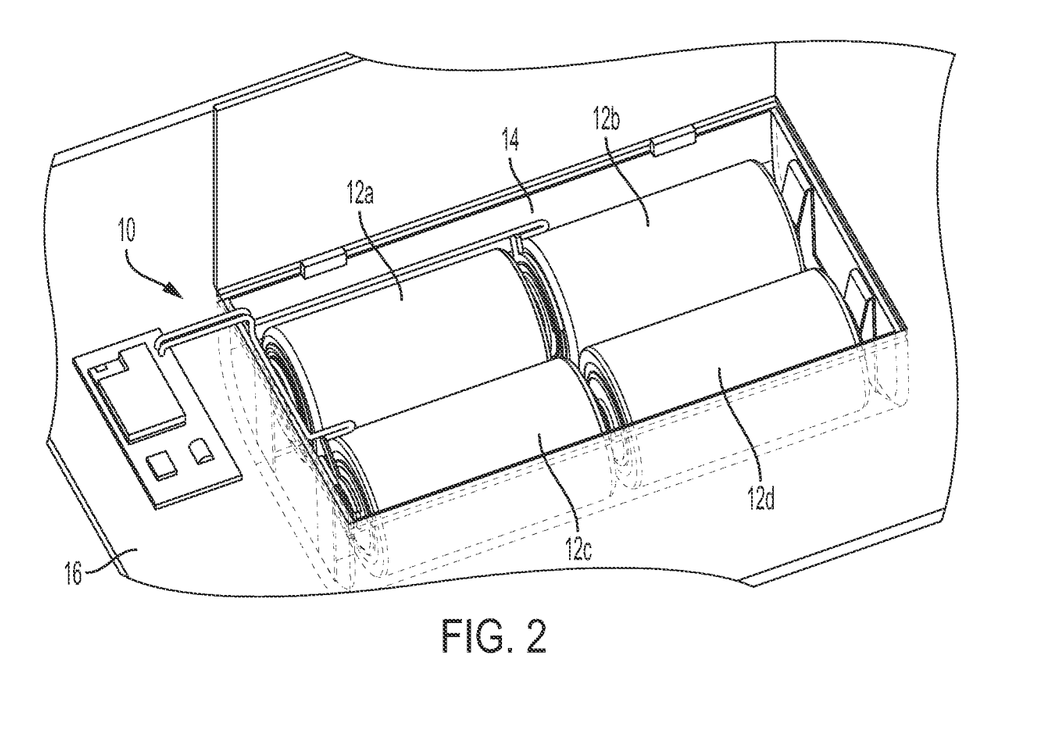
FIG. 2 is a perspective view of the battery cell connection mechanism of FIG. 1 installed on two different batteries in the array of batteries.
Figure 3:
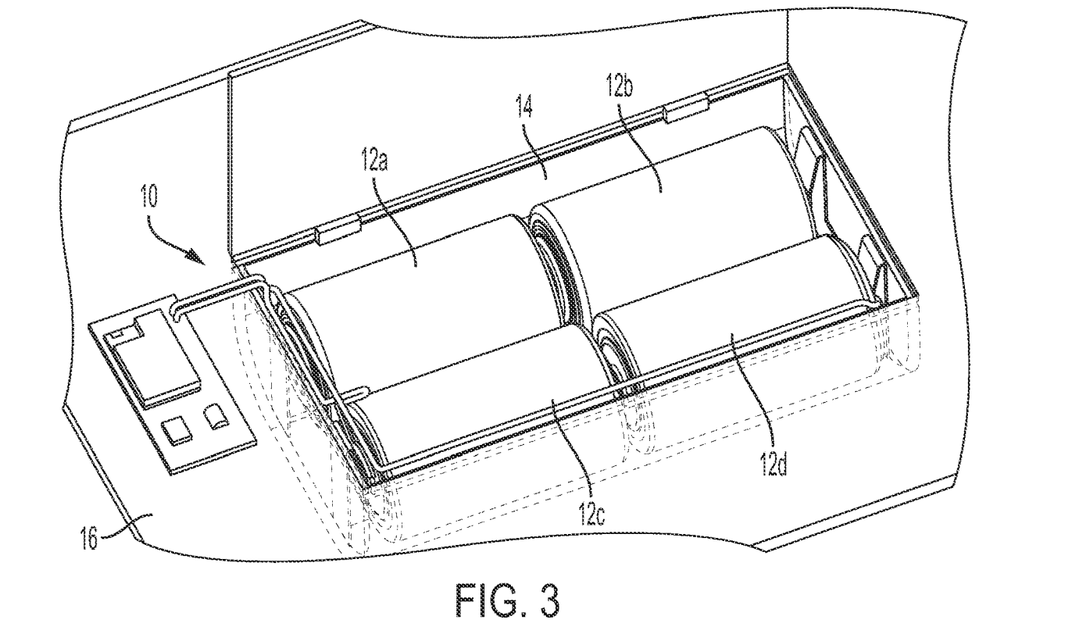
FIG. 3 is a perspective view of the battery cell connection mechanism of FIG. 1 installed on yet two other batteries in the array of batteries.

Referring now to FIGS. 1-3, a magnetic battery cell connection mechanism 10 is illustrated connected to a plurality of battery cells 12 (which may be referred to as an array of battery cells) that are arranged in series and installed in a battery cavity 14 of an electronic device 16 (such as a portable electronic device, a child toy, a flashlight, a portable radio, etc.). The battery cells 12 may comprise a primary alkaline electrochemical cell that includes a cathode, an anode, and a housing. The battery cell 12 also includes an end cap that serves as a negative terminal of the battery cell 12. A positive pip is located at the opposite end of the battery cell 12 from the end cap. The positive pip serves as a positive terminal of the battery cell 12. An electrolytic solution is dispersed throughout the battery cell 12. The battery cell 12 can be, for example, a AA, AAA, AAAA, C, or D alkaline battery.

The housing can be made of any suitable type of housing base material, for example cold-rolled steel or nickel-plated cold-rolled steel. The housing may have a cylindrical shape. The housing may have a sidewall including an interior surface that is treated with a material that provides a low electrical-contact resistance between the interior surface of the sidewall of the housing and an electrode, such as the cathode. The interior surface of the sidewall of the housing may be plated, e.g., with nickel, cobalt, and/or painted with a carbon-loaded paint to decrease contact resistance between, for example, the internal surface of the sidewall of the housing and the cathode.

The magnetic battery cell connection mechanism 10 is illustrated connected to different battery cells 12*a-d* in the array in different figures in FIGS. 1-3. For example, in FIG. 1, the magnetic battery cell connection mechanism 10 is illustrated connected to a lower left battery cell 12*c* and to an upper left battery cell 12*a* in the array, thereby tapping current from four battery cells; in FIG. 2, the magnetic battery cell connection mechanism 10 is illustrated connected to the lower left battery cell 12*c* and to an upper right battery cell 12*b*, thereby tapping current from three battery cells; and in FIG. 3, the magnetic battery cell connection mechanism 10 is illustrated connected to the lower left battery cell 12*c* and to a lower right battery cell 12*d*, thereby tapping current from two battery cells. In this manner, the disclosed magnetic battery cell connection mechanism 10 is capable of generating electrical characteristic information, or of tapping electrical current, for any one or more battery cells and any combination of battery cells in a plurality of battery cells 12*a-d*. In any of the embodiments illustrated in FIGS. 1-3, an external load, such as an electronic module 30 that in some embodiments may comprise a battery indicator, may be located outside of the battery cavity 14, which may advantageously provide easy access to the electronic module 30.

Figure 4:
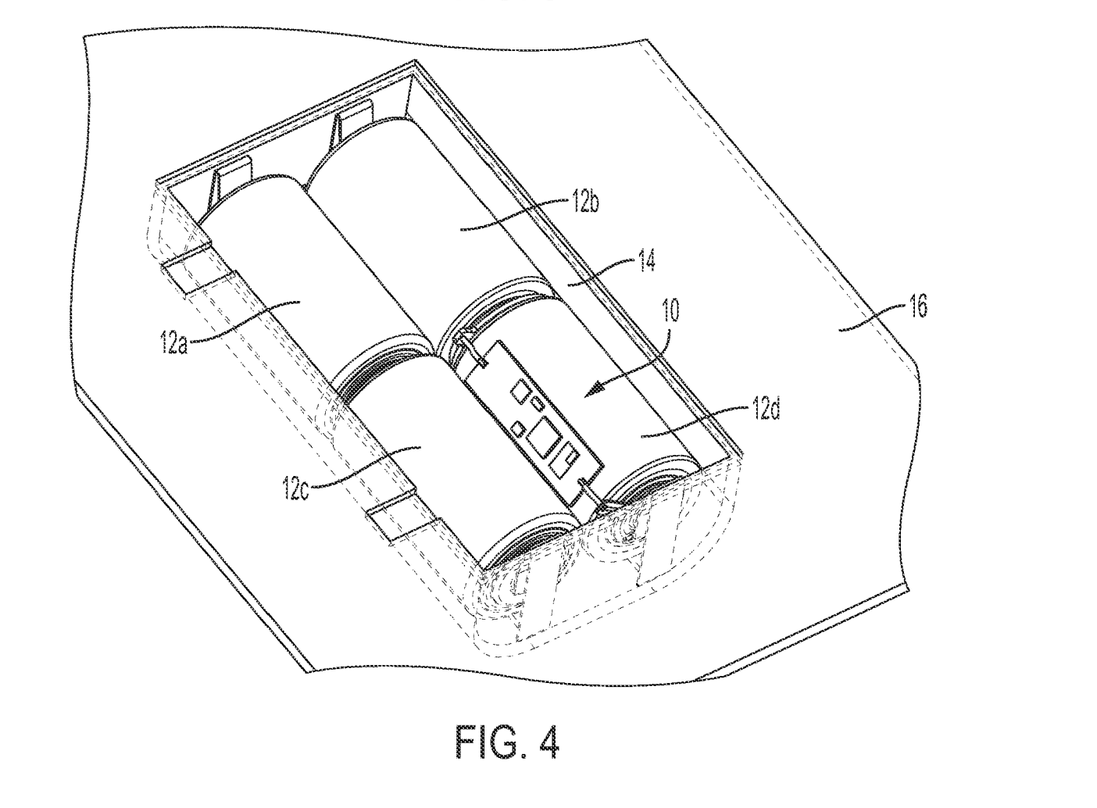
FIG. 4 is a perspective view of the battery cell connection mechanism of FIG. 1 installed on a single battery cell in the array of battery cells.

FIG. 4 illustrates an alternate embodiment of a magnetic battery cell connection mechanism 10 that is connected to a single battery cell 12*d*. In the embodiment of FIG. 4, the electronic module 30 may be located within the battery cavity 14, but not interfering with the electrical connections between battery cells 12, which advantageously secures and protects the electronic module 30 within the battery cavity 14.

Each magnetic battery cell connection mechanism 10 in the embodiments of FIGS. 1-4 includes the external load or electronic module 30, a first or positive connector 32 and a second or negative connector 34. In other embodiments, the positive/negative relationship may be reversed so that the first connector is the negative connector 34 and the second connector is the positive connector 32. Regardless, the first and second connectors 32, 34 are electrically connected to the electronic module 30 with wires 36, 38. The positive connector 32 is electrically connected to a positive terminal 40 of a battery cell 12, while the negative connector is electrically connected to a negative terminal 42 of a battery cell 12, thereby allowing current to flow from the battery cells 12 to the electronic module 30.

The electronic module 30 may include an integrated circuit, which may be incorporated into a printed circuit board (PCB), which in some embodiments may comprise a multi-layered insulator/conductive structure that can be a rigid epoxy, FR4 phelonic with bonded copper traces, or a flexible polyester, polyamide with bonded copper traces. The electronic module 30 may also include an integrated circuit that comprises an embedded voltage sensor within the integrated circuit. The embedded voltage sensor senses analog characteristics of the battery cell 12, such as amperes and voltage, and converts the sensed analog characteristics to digital information. The electronic module 30 may also comprise a communication module, which may establish communications and exchange communication signals with a router, an endpoint, and/or a personal electronic device via one or more communicative connections. More particularly, the communication module includes one or more transceivers configured to transmit and/or receive signals, via the communication connections, with external devices. Communication signals to and/or from the communication module may include wireless signals (RF signals) or wired communication signals (e.g., via USB data connection). The communication module may also include one or more modems configured to convert signals that are received/transmitted, via the one or more transceivers, to signals that are interpreted by a processor and/or a PB app. The electronic module 30 and power bank may be communicatively connected via one or more communicative connections. The one or more communicative connections may include a wireless radio frequency (RF) connection (e.g., via Bluetooth Low Energy (BLE), Zigbee, Universal Plug n Play (UPnP), WiFi low Power, 6LoWPAN, and/or other suitable protocols). An antenna may be operatively coupled to the communication module. In some embodiments, the integrated circuit, may incorporate an analog to digital converter, a microcontroller, a Wi-Fi radio, a memory device, and/or a DC/DC voltage converter.

Figure 5:
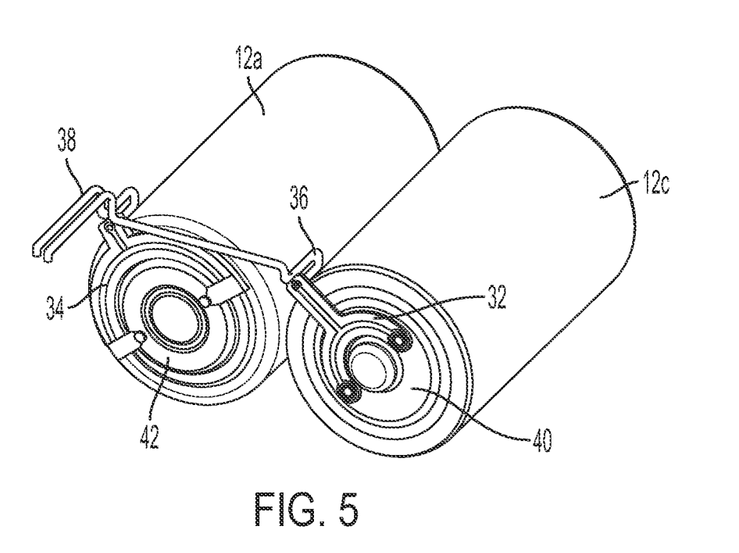
FIG. 5 is a close up end perspective view of the battery cell connection mechanism of FIG. 1 attached to two battery cells.

Turning now to FIG. 5, a close up perspective view of the top left battery cell 12*a* and the bottom left battery cell 12*c* is illustrated from FIG. 1. The top left battery cell 12*a* has the negative connector 34 electrically connected to the negative terminal 42. The bottom left battery cell 12*c* has the positive connector 32 electrically connected to the positive terminal 40. As illustrated in FIG. 5, the positive connector 32 is free to rotate around the positive terminal 40 without losing the electrical connection. Similarly, the negative connector 34 is free to rotate around the negative terminal 42 without losing the electrical connection. Furthermore, because the positive and negative connectors 32, 34 do not cover the top or bottom most parts of the positive and negative terminals 40, 42, the positive and negative connectors 32, 34 may be attached to the positive and negative terminals 40, 42, respectively, while the battery cells 12 are installed in an electronic device without interrupting electrical contact between the battery cell 12 and the contacts of the electronic device.

Figure 6A:
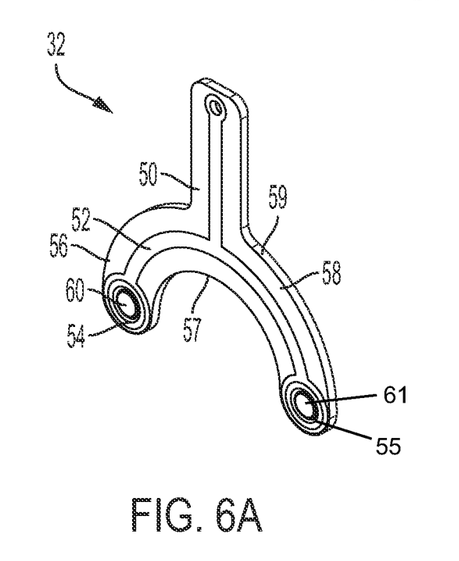
FIG. 6A is a perspective view of a non-contact side of a positive magnetic battery cell connector of the battery cell connection mechanism of FIG. 1.
Figure 6B:
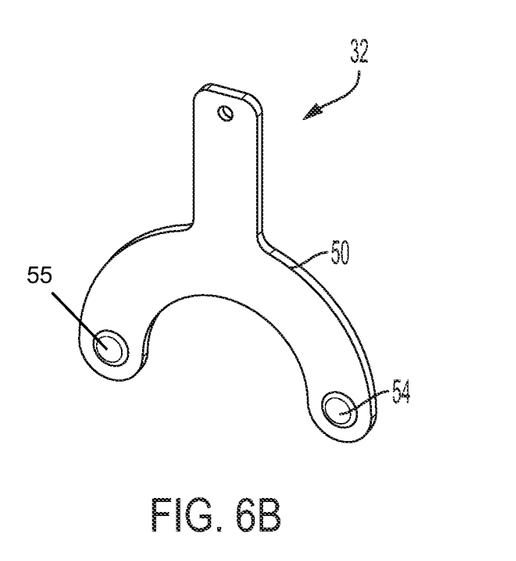
FIG. 6B is a perspective view of a contact side of the positive magnetic battery cell connector of FIG. 6A.
Figure 6C:
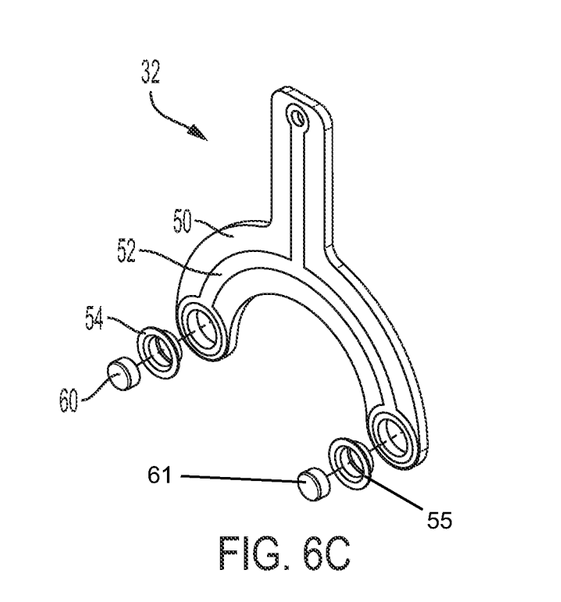
FIG. 6C is an exploded perspective view of the non-contact side of the positive magnetic battery cell connector of FIG. 6A.

Turning now to FIGS. 6A-6C, the positive connector 32 has a first body 50 including a first electrical pathway 52. A first electrical contact 54 is disposed on the first body 50 and electrically connected to the first electrical pathway 54. The first electrical contact 54 is adapted to allow electricity to pass from the positive terminal 40 of the first battery cell 12 to the first electrical pathway.

The first body 50 may include a first arm 56 and a second arm 58 that diverge away from one another. In the embodiment illustrated in FIGS. 6A-6C, the first arm 56 and the second arm 58 form a y-shaped first body 50. In the embodiment illustrated in FIGS. 6A-6C, the y-shaped first body 50 includes an arc-shaped inner surface 57 and an arc-shaped outer surface 59 connecting the first arm 56 and the second arm 58. The arc-shaped inner surface 57 may include a radius that is substantially similar to the radius of the positive terminal 40. In other embodiments, the arc-shaped inner surface 57 may include a radius that differs from the radius of the positive terminal. In yet other embodiments, the first arm 56 and the second arm 58 may form a u-shape or a v-shape. In some embodiments, the first body 50 is provided by a printed circuit board (PCB).

A first magnet 60 is connected to the first body 50, the first magnet 60 being adapted to magnetically releasably secure the first body 50 to the positive terminal 40 of the first battery cell 12 and to establish contact between the positive terminal 40 of the first battery cell 12 and the first electrical pathway 52. In the embodiments of FIGS. 1-7, the first electrical contact 54 has a cup-shape, and the first magnet 60 is at least partially seated within a depression of the cup-shaped first electrical contact 54. The first magnet 60 may be held in place by magnetic attraction to the first electrical contact 54 or by an interference fit with the first electrical contact 54. In other embodiments, the first electrical contact 54 may include a through-hole and the first magnet 60 may be seated at least partially within the through-hole. In still other embodiments, the first magnet 60 and the first electrical contact 54 may be combined into a single unitary structure, or the first magnet 60 may also form the first electrical contact 54 by providing both magnetic attraction and electrical conductivity. In the embodiment illustrated in FIGS. 6A-6C, electrical contacts 54, 55 and magnets 60, 61 are disposed near terminal ends of first arm 56 and the second arm 58. In other embodiments, only one of the first arm 56 and the second arm 58 may include the first electrical contact 54 and the first magnet 60. In yet other embodiments, the first electrical contact 54 may be disposed on the first arm 56 and the first magnet 60 may be disposed on the second arm 58.

Figure 7A:
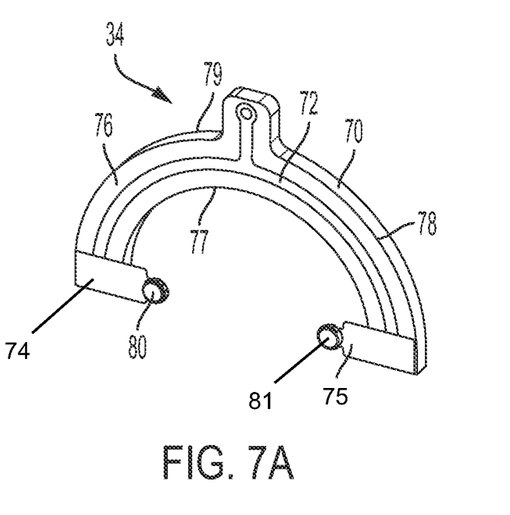
FIG. 7A is a perspective view of a non-contact side of a negative magnetic battery cell connector of the battery cell connection mechanism of FIG. 1.
Figure 7B:
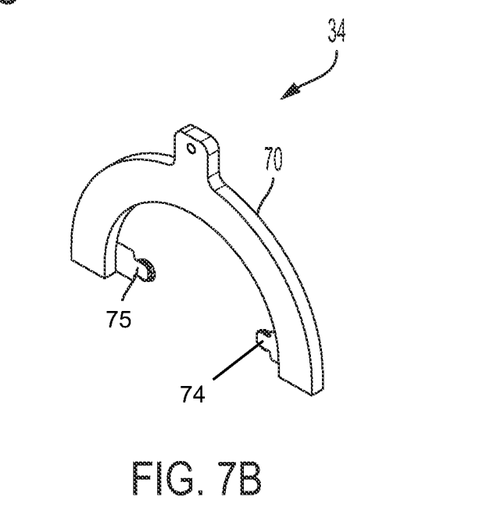
FIG. 7B is a perspective view of a contact side of the negative magnetic battery cell connector of FIG. 7A.
Figure 7C:
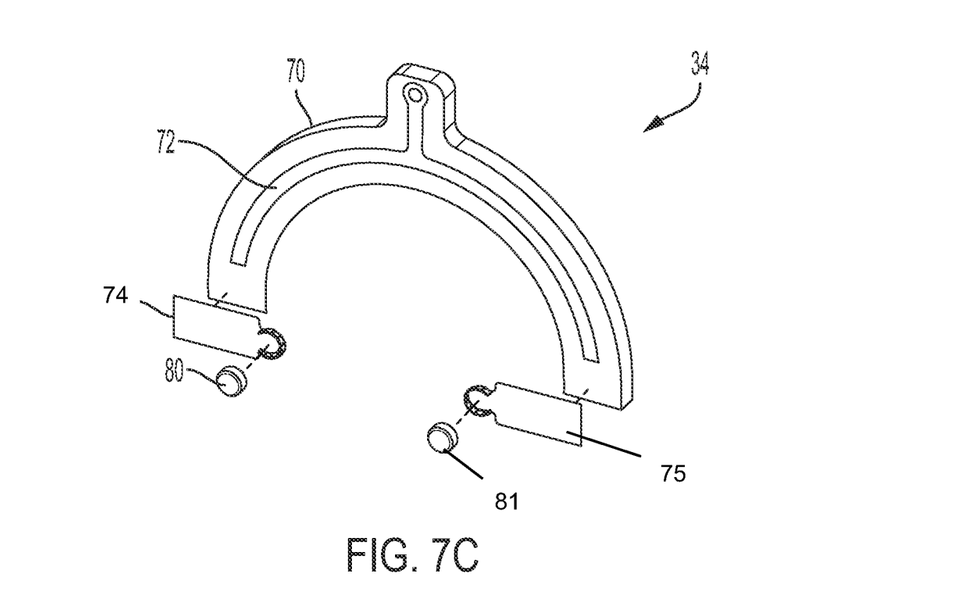
FIG. 7C is an exploded perspective view of the non-contact side of the negative magnetic battery cell connector of FIG. 7C.

Turning now to FIGS. 7A-7C, the negative connector 34 has a second body 70 including a second electrical pathway 72. A second electrical 74 contact is disposed on the second body 70 and is electrically connected to the second electrical pathway 72. In the embodiment illustrated in FIGS. 7A-7C, the second electrical contact 74 takes the form of a rectangular contact plate, although the contact plate could have any shape and/or size that allows the contact plate to establish an electrical connection to a battery terminal. The second electrical contact 74 is adapted to allow electricity to pass from the negative terminal 42 of the second battery cell 12 to the second electrical pathway 72.

The second body 70 may include a first arm 76 and a second arm 78 that diverge away from one another. In the embodiment illustrated in FIGS. 7A-7C, the first arm 76 and the second arm 78 form a y-shaped second body 70. In the embodiment illustrated in FIGS. 7A-7C, the y-shaped second body 70 includes an arc-shaped inner surface 77 and an arc-shaped outer surface 79 connecting the first arm 76 and the second arm 78. The arc-shaped inner surface 77 may include a radius that is substantially similar to the radius of the negative terminal 42. In other embodiments, the arc-shaped inner surface 77 may include a radius that differs from the radius of the negative terminal. In yet other embodiments, the first arm 56 and the second arm 58 may form a u-shape or a v-shape. In some embodiments, the second body 70 is provided by a printed circuit board (PCB).

A second magnet 80 is connected to the second body 70, the second magnet 80 is adapted to magnetically releasably secure the second body 70 to the negative terminal 42 of the second battery cell 12 and to establish contact between the negative terminal 42 of the second battery cell 12 and the second electrical pathway 74. In the embodiments of FIGS. 1-7, the second electrical contact 74 includes a cup-shaped retaining element, and the second magnet 80 is at least partially seated within the cup-shaped retaining element of the second electrical contact 74. The second magnet 80 may be held in place by magnetic attraction to the second electrical contact 74 or by an interference fit with the second electrical contact 74. In other embodiments, the second electrical contact 74 may include a through-hole and the second magnet 80 may be seated at least partially within the through-hole. In still other embodiments, the second magnet 80 and the second electrical contact 74 may be combined into a single unitary structure, or the second magnet 80 may also form the second electrical contact 74 by providing both magnetic attraction and electrical conductivity. In the embodiment illustrated in FIGS. 7A-7C, electrical contacts 74, 75 and magnets 80, 81 are disposed near terminal ends of the first arm 76 and the second arm 78. In other embodiments, only one of the first arm 76 and the second arm 78 may include the second electrical contact 74 and the second magnet 80. In yet other embodiments, the second electrical contact 74 may be disposed on the first arm 76 and the second magnet 80 may be disposed on the second arm 78.

The positive connector 32 and the negative connector 34 are electrically connected to an electrical circuit, such as an electrical circuit provided by the electronic module 30, by the wires 36, 38 (FIGS. 1 and 5).

The first magnet 60 releasably secures the positive connector 32 to the positive terminal 40 of the first battery cell 12 by a magnetic attraction to the positive terminal 40. Similarly, the second magnet 81 releasably secures the negative connector 34 to the negative terminal 42 of the second battery cell 12 by a magnetic attraction to the negative terminal 42. In the illustrated embodiment, a plurality of first magnets 60, 61, and a plurality of second magnets 80, 81, provide symmetrical magnetic attraction to the positive terminal 40 and to the negative terminal 42, respectively, to enhance the electrical connections.

Figure 8A:
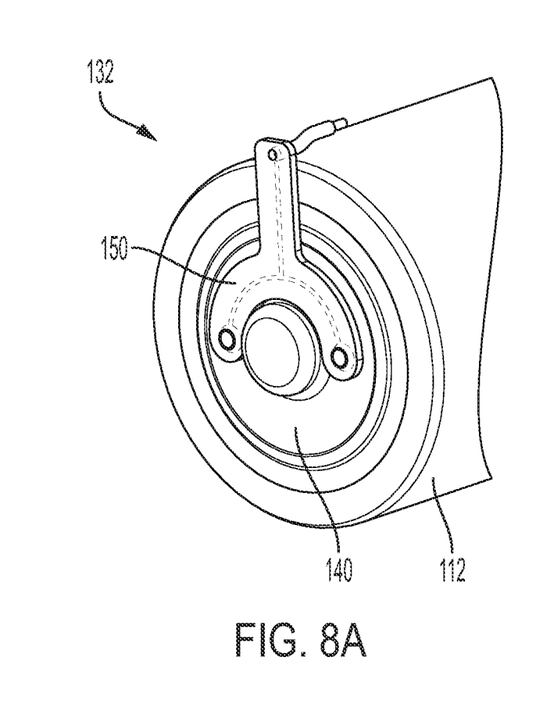
FIG. 8A is a close-up perspective view of an alternate embodiment of a positive magnetic battery cell connector.
Figure 8B:
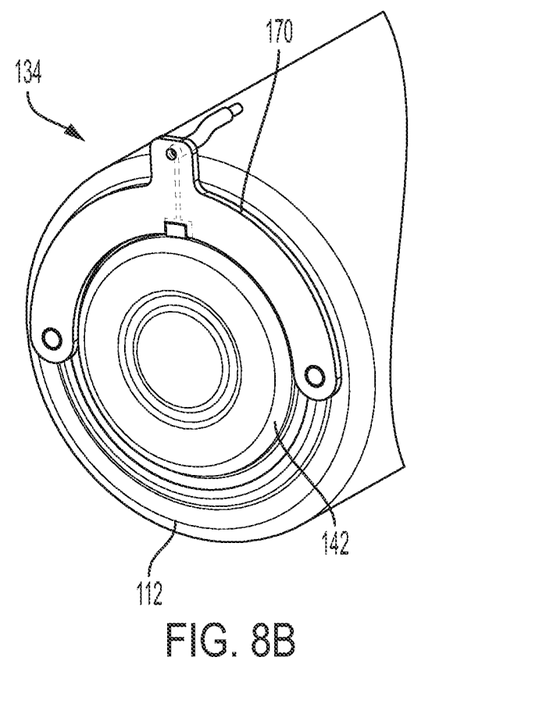
FIG. 8B is a close-up perspective view of an alternate embodiment of a negative magnetic battery cell connector.
Figure 9A:
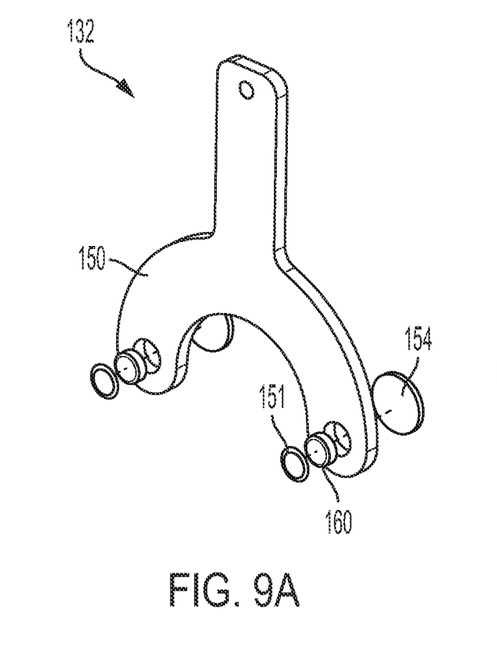
FIG. 9A is an exploded perspective view of a non-contact side of the positive magnetic battery cell connector of FIG. 8A.
Figure 9B:
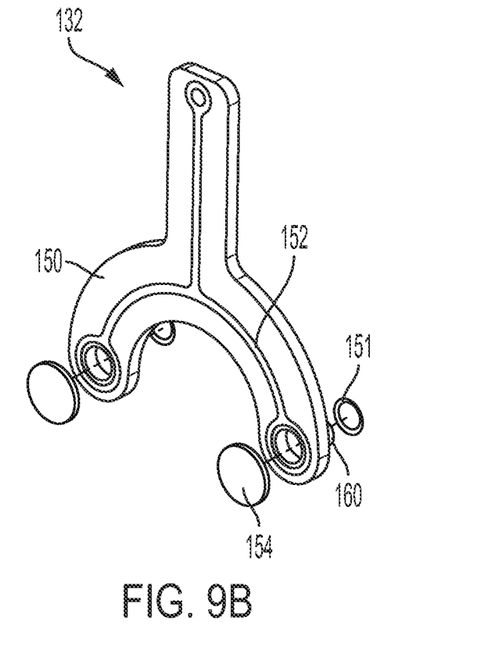
FIG. 9B is an exploded perspective view of a contact side of the positive magnetic battery cell connector of FIG. 8A.
Figure 10A:
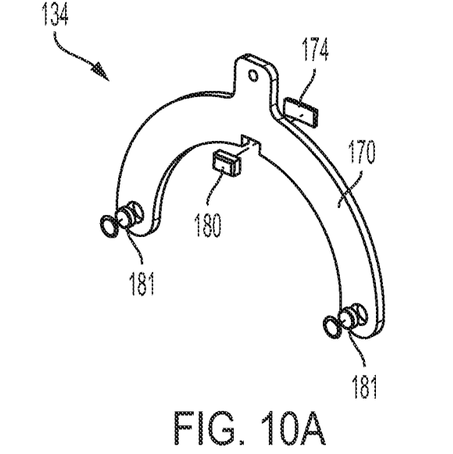
FIG. 10A is an exploded perspective view of a non-contact side of the negative magnetic battery cell connector of FIG. 8B.
Figure 10B:
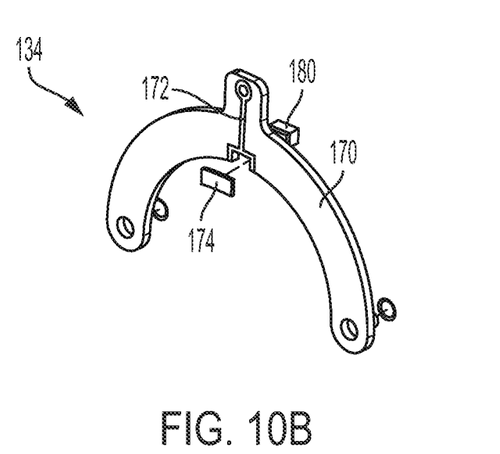
FIG. 10B is an exploded perspective view of a contact side of the negative magnetic battery cell connector of FIG. 8B.

Turning now to FIGS. 8-10, alternate embodiments of first and second magnetic battery cell connectors 132, 134 are illustrated. In the embodiments illustrated in FIGS. 8-10, reference numbers are exactly 100 greater than the reference numbers for like elements of the embodiments illustrated in FIGS. 1-7. For example, the first or positive connector 132 in FIG. 8A is 100 greater than the first or positive connector 32 in FIG. 5. Any elements illustrated in the embodiment of FIGS. 8-10 may be combined with any element illustrated in the embodiment of FIGS. 1-7, and vice versa.

The positive connector 132 includes a first body 150 including a first electrical pathway 152. A first electrical contact 154 is electrically connected to the first electrical pathway 152. The first electrical contact 154 comprises a conductive plate. In some non-illustrated embodiments, the first electrical pathway 152 may comprise the first electrical contact 154, thereby eliminating the need for a separate conductive plate. In such embodiments, the first electrical pathway 152 faces the positive terminal 140 and directly contacts the positive terminal 140, thereby forming a direct electrical connection between the first electrical pathway 152 and the positive terminal 140. In such embodiments, the first electrical contact 154 is integrally formed with the first electrical pathway 152.

A first magnet 160 is disposed in an opening in the first body 150. When appropriately positioned, the first magnet 160 magnetically holds the first electrical contact 154 in contact with the first body 150, and thus in electrical contact with the first electrical pathway 154. The first magnet 160 also magnetically releasably secures the first body 150 to the positive terminal 140 of the first battery cell 112 by magnetizing the first electrical contact 154 and thus establishes contact between the positive terminal 140 of the first battery cell 112 and the first electrical pathway 152 through the first electrical contact 154. The first magnet 160 may be held in the opening in the first body 150 by a gasket 151 or similar element, such as an adhesive. In other embodiments, the first magnet 160 may form an interference fit in the opening in the first body 150, or an adhesive may secure the first magnet 160 in the opening.

The negative connector 134 includes a second body 170 including a second electrical pathway 172. A second electrical contact 174 is electrically connected to the second electrical pathway 172. The second electrical contact 174 comprises a conductive plate, such as a ferromagnetic plate. In some non-illustrated embodiments, the second electrical pathway 172 may comprise the second electrical contact 174, thereby eliminating the need for a separate conductive plate. In such embodiments, the second electrical pathway 172 faces the negative terminal 142 and directly contacts the negative terminal 142, thereby forming a direct electrical connection between the second electrical pathway 172 and the negative terminal 142. In such embodiments, the second electrical contact 174 is integrally formed with the second electrical pathway 172.

A second magnet 180 is disposed in an opening in the second body 170. When appropriately positioned, the second magnet 180 magnetically holds the second electrical contact 174 in contact with the second body 170, and thus in electrical contact with the second electrical pathway 172. The second magnet 180 also magnetically releasably secures the second body 170 to the negative terminal 142 of the battery cell 112 by magnetizing the second electrical contact 174 and thus establishes contact between the negative terminal 142 of the battery cell 112 and the second electrical pathway 172 through the second electrical contact 174. Optional securing magnets 161 may also be located at other positions on the second body 170 top aid in retention to the negative terminal 142. The embodiment of FIGS. 10A and 10B may provide particularly advantageous magnetic connection to the negative terminal 142 when the battery cell 112 has an insulating battery label that impedes magnetic electrical connections on the face of the negative terminal because the second magnet is magnetically attracted to the raised annular surface of the negative terminal as well as to the flat disc-shaped surface of the negative terminal. The second magnet 180, which may comprise an arc-shaped magnet, also provides an electrical connection on the raised annular edge of the negative terminal 142.

Figure 11:
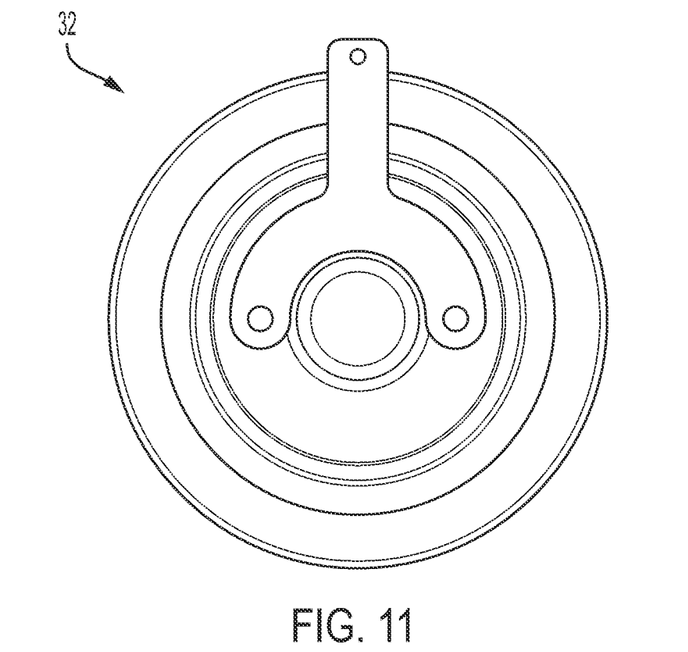
FIG. 11 is a plan view of the positive magnetic cell connector of FIG. 8A.
Figure 12:
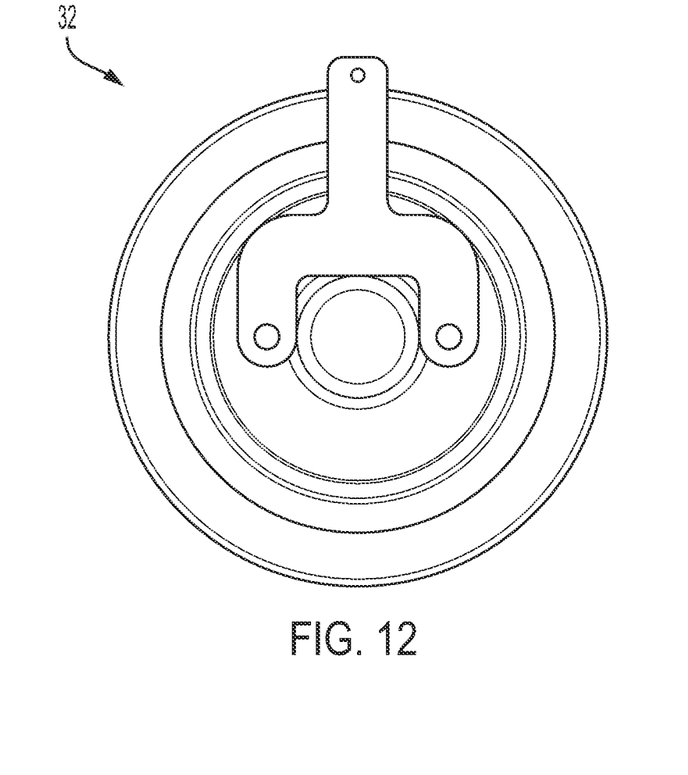
FIG. 12 is a plan view of an alternate embodiment of a positive magnetic battery cell connector.

FIGS. 11 and 12 illustrate alternative shapes for the positive connector 32. The electrical pathways in FIGS. 11 and 12 are omitted for clarity. Similar alternative body shapes may be used for the negative connector 34.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A magnetic battery cell connection mechanism comprising:
    a first battery cell having a positive terminal and a negative terminal;
    a second battery cell having a positive terminal and a negative terminal;
    a first connector having a first body including a first electrical pathway;
    a first electrical contact disposed on the first body and electrically connected to the first electrical pathway, the first electrical contact being adapted to allow electricity to pass from the positive terminal of the first battery cell to the first electrical pathway; and
    a first magnet connected to the first body, the first magnet being adapted to magnetically releasably secure the first body to the positive terminal of the first battery cell and to establish contact between the positive terminal of the first battery cell and the first electrical pathway;
    a second connector having a second body including a second electrical pathway;
    a second electrical contact disposed on the second body and electrically connected to the second electrical pathway, the second electrical contact being adapted to allow electricity to pass from the negative terminal of the second battery cell to the second electrical pathway;
    a second magnet connected to the second body, the second magnet being adapted to magnetically releasably secure the second body to the negative terminal of the second battery cell and to establish contact between the negative terminal of the second battery cell and the second electrical pathway; and
    an electrical circuit, each of the first connector and the second connector being electrically connected to the electrical circuit.

2. The magnetic battery cell connection mechanism of claim 1, wherein the first magnet comprises the first electrical contact.

3. The magnetic battery cell connection mechanism of claim 1, wherein the second magnet comprises the second electrical contact.

4. The magnetic battery cell connection mechanism of claim 1, wherein the first electrical pathway comprises the first electrical contact.

5. The magnetic battery cell connection mechanism of claim 1, wherein the second electrical pathway comprises the second electrical contact.

6. The magnetic battery cell connection mechanism of claim 1, wherein one of the first body or the second body comprises a first arm and a second arm that diverge away from one another.

7. The magnetic battery cell connection mechanism of claim 6, wherein the first and second arms form one of an arc-shape, a u-shape, and a v-shape.

8. The magnetic battery cell connection mechanism of claim 7, wherein the first and second arms form an arc-shape and an inner radius of the arc-shape is substantially the same as a battery end cap of one of the first battery cell or the second battery cell.

9. The magnetic battery cell connection mechanism of claim 6, wherein the first magnet is located on the first arm and the first electrical contact is located on the second arm.

10. The magnetic battery cell connection mechanism of claim 6, wherein the first magnet and the first electrical contact are located on the same arm.

11. The magnetic battery cell connection mechanism of claim 1, wherein the first electrical contact is cup-shaped and the first magnet is at least partially seated in the first electrical contact.

12. The magnetic battery cell connection mechanism of claim 6, further comprising a first contact plate at the end of the first arm and the first magnet is disposed on the first contact plate.

13. The magnetic battery cell connection mechanism of claim 12, further comprising a second contact plate at the end of the second arm.

14. The magnetic battery cell connection mechanism of claim 1, wherein one of the first body or the second body comprises a printed circuit board (PCB).

15. A magnetic battery cell connection mechanism comprising:
a first battery cell having a positive terminal and a negative terminal;
a first connector having a first body including a first electrical pathway;
a first electrical contact disposed on the first body and electrically connected to the first electrical pathway, the first electrical contact being adapted to allow electricity to pass from the positive terminal of the first battery cell to the first electrical pathway; and
a first magnet at least partially seated in the first electrical contact, the first magnet being adapted to magnetically releasably secure the first body to the positive terminal of the first battery cell;
a second connector having a second body including a second electrical pathway;
a second electrical contact disposed on the second body and electrically connected to the second electrical pathway, the second electrical contact being adapted to allow electricity to pass from the negative terminal of the first battery cell to the second electrical pathway;
a second magnet at least partially seated in the second electrical contact, the second magnet being adapted to magnetically releasably secure the second body to the negative terminal of the first battery cell; and
an electrical circuit, each of the first connector and the second connector being electrically connected to the electrical circuit.

16. The magnetic battery cell connection mechanism of claim 15, wherein one of the first body or the second body comprises a first arm and a second arm that diverge away from one another.

17. The magnetic battery cell connection mechanism of claim 16, wherein the first and second arms form one of an arc-shape, a u-shape, or a v-shape.

18. The magnetic battery cell connection mechanism of claim 17, wherein the first and second arms form an arc-shape and an inner radius of the arc-shape is substantially the same as a battery end cap of one of the first battery cell or the second battery cell.

19. The magnetic battery cell connection mechanism of claim 1, wherein the first magnet and the first electrical contact are located on the same arm.

20. The magnetic battery cell connection mechanism of claim 1, wherein the first electrical contact is cup-shaped and the first magnet is at least partially seated in the first electrical contact.

* * * * *